United States Patent
Nishikawa

(10) Patent No.: US 8,607,273 B2
(45) Date of Patent: Dec. 10, 2013

(54) RECOMMENDATION COMPARISON DISPLAY

(75) Inventor: Yuko Nishikawa, La Jolla, CA (US)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 13/014,915

(22) Filed: Jan. 27, 2011

(65) Prior Publication Data

US 2012/0198495 A1 Aug. 2, 2012

(51) Int. Cl.
*G06F 3/00* (2006.01)
*G06F 13/00* (2006.01)
*H04N 5/445* (2011.01)

(52) U.S. Cl.
USPC .................................. 725/40; 725/44; 725/48

(58) Field of Classification Search
USPC ...................................................... 725/37–61
See application file for complete search history.

(56) References Cited

U.S. PATENT DOCUMENTS

| | | | |
|---|---|---|---|
| 6,757,707 B1 | 6/2004 | Houghton et al. | |
| 7,296,284 B1 * | 11/2007 | Price et al. | 725/39 |
| 7,392,531 B2 * | 6/2008 | Thurston et al. | 725/96 |
| 7,739,280 B2 | 6/2010 | Aravamudan et al. | |
| 8,141,114 B2 * | 3/2012 | Conradt et al. | 725/47 |
| 2006/0020973 A1 * | 1/2006 | Hannum et al. | 725/46 |
| 2007/0136753 A1 * | 6/2007 | Bovenschulte et al. | 725/46 |
| 2007/0179835 A1 * | 8/2007 | Ott et al. | 705/10 |
| 2007/0219856 A1 * | 9/2007 | Ahmad-Taylor | 705/14 |
| 2009/0019485 A1 * | 1/2009 | Ellis et al. | 725/40 |
| 2010/0042460 A1 | 2/2010 | Kane, Jr. | |
| 2010/0199219 A1 * | 8/2010 | Poniatowski et al. | 715/825 |
| 2010/0262995 A1 * | 10/2010 | Woods et al. | 725/40 |
| 2011/0138423 A1 * | 6/2011 | Pickelsimer et al. | 725/46 |
| 2011/0302596 A1 * | 12/2011 | Lundgren et al. | 725/9 |
| 2012/0059825 A1 * | 3/2012 | Fishman et al. | 707/737 |

OTHER PUBLICATIONS

Clover, "TV Genius Launches 3-screen TV Search," Broadband TV News, Dec. 4, 2009.
Shin et al., "PersonalizedDigital TV Content Recommendation with Integration of User Behavior Profiling and Multimodal Content Rating," IEEE Xplore Digital Library, Aug. 2009.

* cited by examiner

*Primary Examiner* — Hunter B Lonsberry
*Assistant Examiner* — Alexander Q Huerta
(74) *Attorney, Agent, or Firm* — Miller Patent Services; Jerry A. Miller

(57) ABSTRACT

A method for consolidating and comparing recommendations in selecting TV content for viewing by compiling and displaying recommendation and rating values for the same TV content from Sony and a number of other recommendation and ratings providers. Presenting all recommendation values on a single visual display and providing the preferred Sony recommendation in the most prominent display position and font, and allowing the viewer to select the Sony recommendation value to select that content for viewing.

17 Claims, 4 Drawing Sheets

RECOMMENDATION COMPARISON DISPLAY

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The internet has experienced an exponential growth of users due to the arrival of web 2.0. Web 2.0 is different from web 1.0 in many ways. One of the most distinctive difference is that web 2.0, for the first time, gives control to the users. This control enables user to generate and participate in the content creation and development of the internet. The users not only have control, but also ownership of their work.

As we move forward into an era of IPTV (Internet Protocol Television), this explosive growth of television viewers who are internet users are attempting to apply their internet experience to television viewing. As such, more users are coming to demand the experience in television viewing that they are used to on the internet, such as access to an ocean of digital media content.

The Sony recommendation service is one aspect of Sony's ability to assist users in navigating the ocean of digital media content. The recommendation service presents rating values for digital media content and presents options for users in their selection of digital media for preferred viewing. Users may access the Sony recommendation service and be presented with digital media content that may be trusted to be to their liking.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
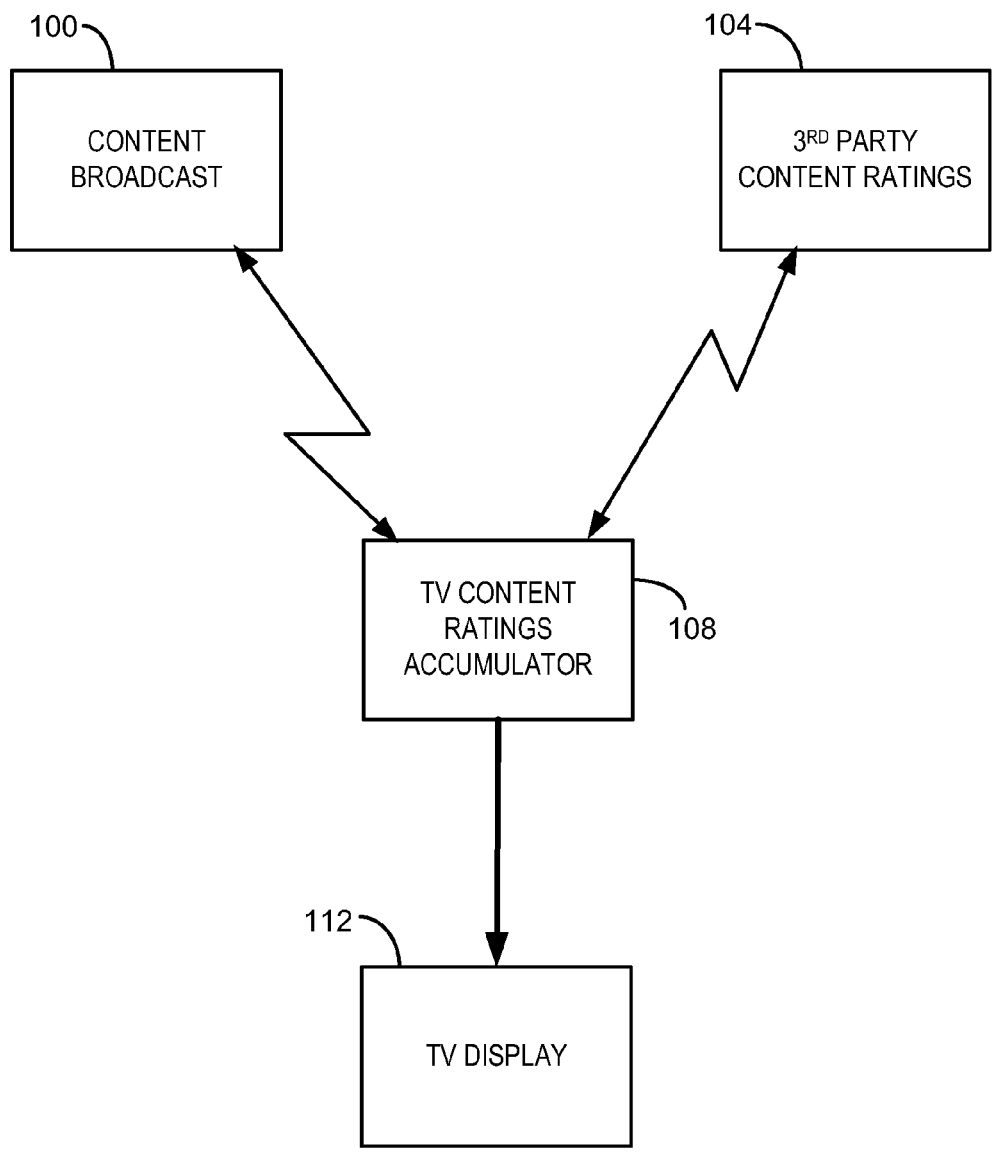
FIG. 1 is a diagram of an exemplary system configuration diagram consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", or "application" or "app" or the like may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Software and/or firmware embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Content may be embodied as any or all audio, video, multimedia or interactive data that may be encoded with entertainment, training, artistic, textual, or experimental subject matter that is created for playback in modes such as compact disc (CD), digital versatile disc (DVD), high definition DVD (HD-DVD), Blu-ray Disc (BD) of any suitable format, tape, Internet streams or downloads, handheld players, computer storage media or any other suitable playable modes.

The explosive growth of television viewing on the internet has given rise to the increasing presence of internet television capability in individual and group viewing locations, such as homes or bars that provide televised entertainment in non-limiting examples. As more users come to demand the video experience that they are accustomed to on the Internet, such as access to a tremendous variety and quantity of digital media content, the need for video entertainment rating service to assist users in determining relative merit for content that is of a quality the user might wish to view has arisen. Rating systems exist, however a single comparison that consolidates multiple ratings for given program content which would allow users to view and compare ratings, even when the ratings systems presented utilize different characters or scales, is not available in the marketplace. In extension, the presentation of a Sony content recommendation presented for a user on the single display such that a user may formulate a view of how the Sony recommendation may be trusted in comparison with a plurality of other ratings systems presented concurrently may be provided to a user upon the selection of a recommendation icon.

Turning now to FIG. 1, consistent with certain embodiments of the invention this figure presents an exemplary view of one possible system configuration for the Sony recommendation comparison system. In this exemplary configuration, the broadcast content 100 is presented to a user on the display of a television. The television may, in this exemplary embodiment, contain a function that accumulates Sony recommendations and a plurality of $3^{rd}$ party content ratings 104 for the same broadcast content being received at the television. The content ratings 104 may be stored within a storage area that is local to the television, or may be stored within a content server that is in network communication with the television. The content ratings 104 may include ratings from both Sony recommendations and $3^{rd}$ party recommendation sites that are integrated such that all ratings for a particular broadcast content 100 show are retrieved simultaneously upon request. Recommendation requests may be activated by a user selecting a Sony recommendation icon on the display screen. In an alternative exemplary implementation, Sony recommendations may be retrieved for display upon a power up action of the television, or may be scheduled to be retrieved at pre-set times for review by a user. The ratings from all sources for the incoming broadcast content are collected by the television content ratings accumulator 108 and prepared for presentation to the user. Sony recommendations may be presented to a user with a rating value that is consistent in style and range of value for each item of broadcast content that is recommended by Sony recommendations. Third party recommendations may be presented to a user with a rating defined and in consistent use for each Third party recommendation site. In this exemplary implementation each recommendation may be presented with a different rating style and range of value that is particular to the Third party recommendation site. When Third party recommendation sites use the same rating style and range of values, the broadcast content recommendation will be presented with the rating value assigned to the content by the Third party recommendation site. When a user selects a recommendation function all of the recommendations with rating values are presented to the user for the identified broadcast content, with the Sony recommendation presented in a more prominent manner through the use of various functions such as different screen location, higher contrast coloring, different fonts, or any other method of presenting the Sony recommendation in a more prominent fashion. The Sony recommendation and all third party recommendations, each recommendation displayed with an associated rating value where available, are then displayed on the television display 112 for review by the user.

Figure 2:
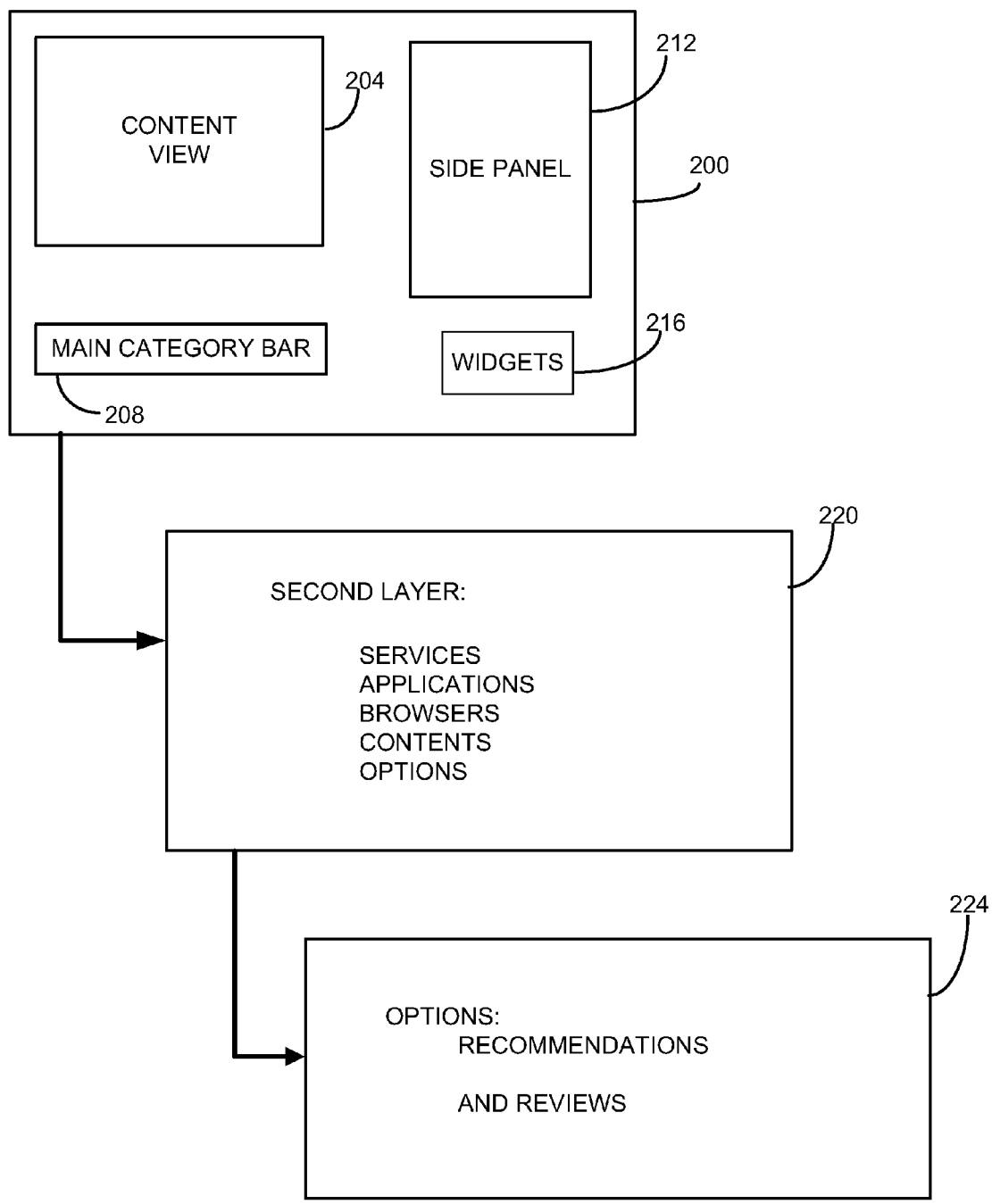
FIG. 2 is a diagram of an exemplary Network User Experience (NUX) platform mapping diagram consistent with certain embodiments of the present invention.

Turning now to FIG. 2, consistent with certain example embodiments of the invention this figure presents a diagram of the mapping of the Network Unified Experience (NUX) platform layers. The NUX platform is provided for use with platforms such as a television, handheld devices, and mobile devices. The Sony recommendation function may be configured for use in any NUX platform implementation. In this non-limiting example, the user may be presented with a first layer of the Network Unified Experience (NUX). The NUX Home entrance at 200 may present the user with a plurality of icons representing content and functions available for selection. In this exemplary diagram the NUX Home display may present a content view 204 containing content which the user may select for viewing or for which other functions or operations may be selected. In this exemplary implementation, the NUX Home display may also include a main category bar 208 that contains icons representing categories of functions available for selection. By way of example and not of limitation, the main category bar 208 may contain icons for such categories as service offerings, applications, network connectivity, alternate content channel selections, and other categories of functions to be accessed by a user. The NUX Home display may also present the user with a side panel containing icons that may be snapshots of additional functions the user may directly select to swap into a full screen display, replacing the current content being viewed. The sidebar icons may be mapped to content such as a web application, a function such as, by way of example, a current weather display, a function such as, by way of example, the latest view of the stock market averages, or any other application or function that may be immediately accessible instead of having to select the function or application from a category prior to viewing on the television display. The NUX Home display may also present the user with one or more Widgets 216 that represent functions that perform operations directly for the user when the Widget is selected. Each of these icons, panels and widgets presented on the NUX Home display may be mapped to a second layer of functionality 220 within the NUX platform. The second layer of functionality 220 provides the system with a layer of abstraction between the NUX Home display and the services, applications, browsers, content, and options that may be selected for use or viewing by the user. In the current exemplary implementation, the Sony recommendation and rating service may be accessed through a category icon on the main category bar 208, or, if the user has pre-set the service for activation upon power-up of the television or at a specific time, the Sony recommendation and rating service may be activated within a thumbnail icon in the side panel 212. In either case, the NUX platform may map the user selection to a service offering access function in the second layer mapping 220. The NUX platform may then accept the user selection from the second layer and map the selection as a request at the Options layer 224 of the platform functionality. The Options layer 224 may then activate the Sony recommendation and rating service, initiating the service offering and displaying the Sony recommendation and rating for content displayed in the Content view 204 of the NUX Home display 200. The Sony recommendation and rating service display may then allow the user to review the ratings for the displayed content and then select the content for viewing or choose to end the recommendation and rating service display.

Figure 3:
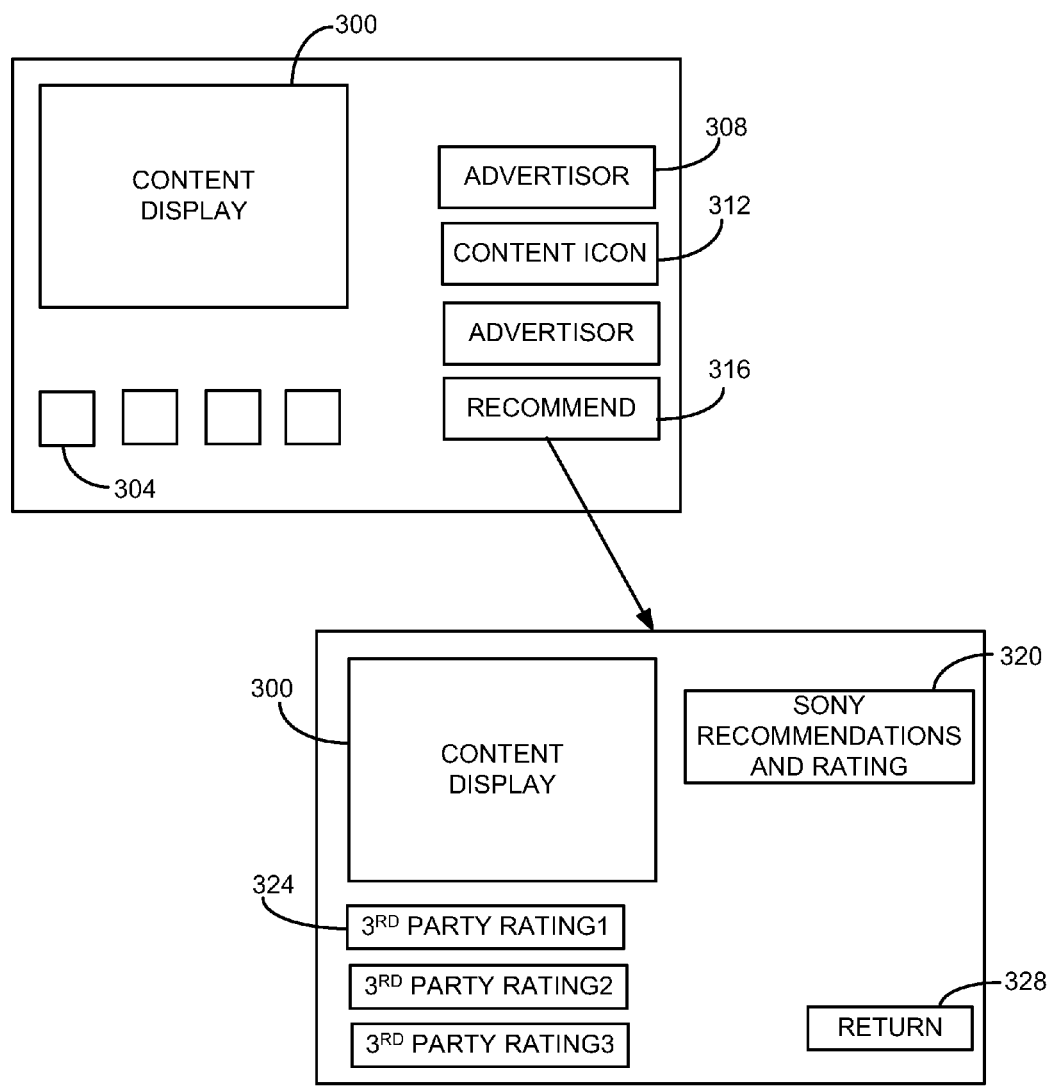
FIG. 3 is a diagram of the recommendation service in use consistent with certain embodiments of the present invention.

Turning to FIG. 3, this figure presents an exemplary view of the NUX Home menu that provides a thumbnail content display 300 to present the user with the content for which the user may request various functions. The NUX Home menu may also display icons 304 for various functions the user may select, as well as presenting advertising 308, additional content 312, and other available functions such as the Sony recommendation function 316.

Upon selection of the Sony recommendation function 316, the user is presented with a display view that displays the content thumbnail display 300, the Sony recommendation and rating 320, and other recommendations and ratings from third party sources 324. As may be seen in this exemplary view, the Sony recommendation and rating 320 is presented to the user in a more prominent position on the display view. In addition, the Sony recommendation and rating 320 may be presented in higher contrast color, or a larger font, or any other manner in which the Sony recommendation and rating may maintain prominence over the other recommendations and ratings 324 presented to the user on this display view. In an alternative exemplary implementation, a Third party recommendation and rating may be presented in an equal, or more prominent, position and font as the Sony recommendation and rating. The user may then select the content thumbnail display to proceed to the content and view the selected content in full screen mode, or the user may select a return to menu function 328 to return to the NUX Home screen display.

Figure 4:
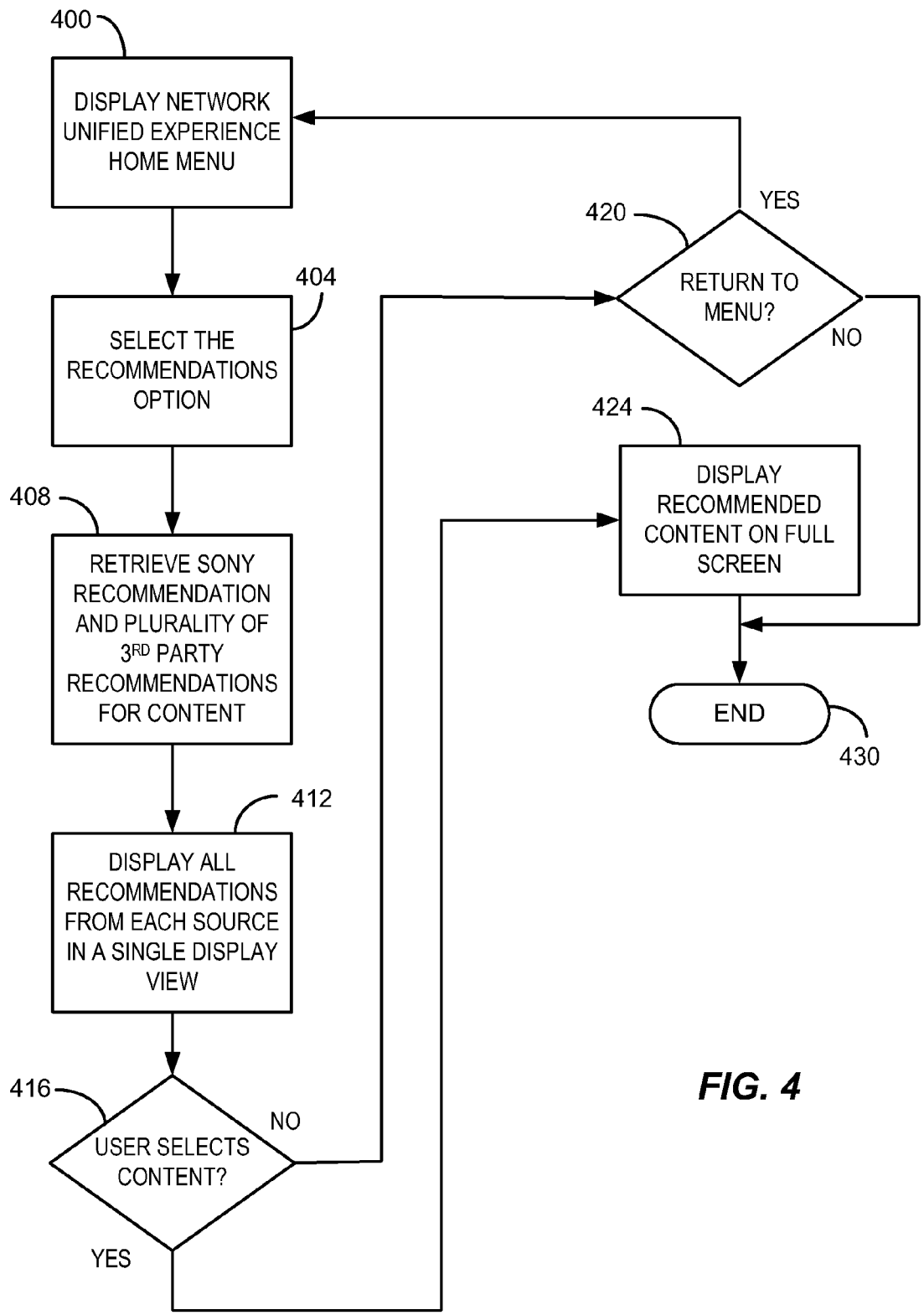
FIG. 4 is an exemplary flow diagram for a recommendation service consistent with certain embodiments of the present invention.

Turning now to FIG. 4, consistent with certain example embodiments of the invention this figure presents a diagram of the operation of the recommendation function when selected by a user. In this non-limiting example, the user may be presented with a NUX Home menu at 400 that may present the user with a plurality of icons representing functions available to a user including an option to select the Sony Recommendations function. In additional non-limiting examples, a remote control in use with the television may have a button on the remote control that requests Sony recommendations upon pressing the button, or the user may be given the option to set up the television to present a list of recommendations when the television is powered up or at pre-set times. Upon selection of the recommendations option, or at a pre-set time, at 404 the function identifies the content to be reviewed and retrieves any available Sony recommendation and all available third party recommendations regarding the identified content from the ratings accumulator at 408. The recommendations are displayed on a single screen view to a user, with the Sony recommendation and rating displayed more prominently, as discussed above, than the third party recommendation and ratings at 412. The use may then review the Sony recommendation and rating against any and all third party recommendations and ratings presented on the display. The third party recommendations and ratings may be provided by established ratings services with whom Sony has contracted, or may be retrieved from social media websites, or may be retrieved from any online or network source that provides a rating and recommendation service for broadcast content. If the user compares the Sony recommendation and rating with other such recommendations and ratings, the user may trust the Sony recommendation as providing a rating for the content that indicates that the user may wish to view the content. The user may then select a content thumbnail screen at 416 to indicate that they wish to view the content provided. If the user does not wish to view the provided content, the user may select a return to menu option at 420 and return to the NUX Home menu for further review.

If the user decides to view the provided content based upon the recommendation provided by the Sony recommendation and rating, the user may select the thumbnail content view and the display may then switch to a full screen display of the selected content at 424. After this selection is made, the recommendation function ends at 430.

While certain illustrative embodiments have been described, it is evident that many alternatives, modifications, permutations and variations will become apparent to those skilled in the art in light of the foregoing description.

What is claimed is:

1. A process for content selection by recommendation comprising:
at a content accumulator, receiving content recommendation values from at least first and second content recommendation providers and storing the content recommendation values at a network accessible storage location;
where at least the second content recommendation provider comprises a social media web site that provides a recommendation value that use a different rating scale than a rating scale used by the first content recommendation site;
at an Internet Protocol television device:
displaying a home display page that includes at least a content view window and a category selection icon,
upon receipt of a command selecting the category selection icon, displaying a second layer page that includes an option selection icon, and
upon receipt of a command selecting the option selection icon, displaying a third page that incorporates a recommendations icon;
automatically requesting the content recommendation values from the content accumulator via a network connection upon receipt of a command selecting the recommendations icon;
at the content accumulator, retrieving the content recommendation values from the storage location and sending the content recommendation values to the Internet Protocol television device;
displaying the content recommendation values on a single visual content recommendation display screen of the Internet Protocol television device, where a first set of content recommendation values from the first content recommendation provider is more prominent than the second set of content recommendation values for the same content on the single visual display; and
selecting the content recommendation value replaces the content recommendation display screen with the content associated with the selected content recommendation value.

2. A process according to claim 1, where the first set of content recommendation values is provided by a content recommendation engine.

3. A process according to claim 1, where the prominent content recommendations are presented to the viewer in a larger font, greater contrast color, and different font than the content recommendations on the visual display screen.

4. A process according to claim 1, further comprising associating metadata regarding the content being recommended to the content recommendation value including content location and availability.

5. A process according to claim 1, where the content recommendation format comprises a rating number within a defined range, a rating of one or more objects from a defined range of objects, a rating of whole and partial objects from a defined range of objects, a percentage rating, a color rating, or any chart type rating.

6. A process according to claim 1, where a plurality of rating systems each of which is associated with one or more recommendation value are displayed concurrently on a single display view.

7. A process according to claim 1, where at least one rating system is accessed by selecting a function from an integrated network services platform.

8. A process according to claim 7, where the integrated network services platform is associated with a television.

9. A non-transitory computer readable medium storing instructions for content selection by recommendation comprising:
- compiling content recommendation values from at least first and second content recommendation providers;
- where at least the second content recommendation provider comprises a social media web site that provides a recommendation value that use a different rating scale than a rating scale used by the first content recommendation site;
- displaying a home display page that includes at least a content view window and a category selection icon,
- upon receipt of a command selecting the category selection icon, displaying a second layer page that includes an option selection icon, and
- upon receipt of a command selecting the option selection icon, displaying a third page that incorporates a recommendations icon;
- automatically requesting the content recommendation values from the content accumulator via a network connection upon receipt of a command selecting the recommendations icon;
- displaying the content recommendation values on a single visual content recommendation display screen where a first set of content recommendation values from the first content recommendation provider is more prominent than all other sets of content recommendation values for the same content on the single visual display; and
- selecting the content recommendation value replaces the content recommendation display screen with the content associated with the selected content recommendation value.

10. A non-transitory computer readable medium as in claim 9, where the first set of content recommendation values is provided by a content recommendation engine.

11. A non-transitory computer readable medium as in claim 9, where the prominent content recommendations are presented to the viewer in a larger font, greater contrast color, and different font the content recommendations on the visual display screen.

12. A non-transitory computer readable medium as in claim 9, further comprising associating metadata regarding the content being recommended to the content recommendation value including content location and availability.

13. A non-transitory computer readable medium as in claim 9, where the content recommendation format comprises a rating number within a defined range, a rating of one or more objects from a defined range of objects, a rating of whole and partial objects from a defined range of objects, a percentage rating, a color rating, or any chart type rating.

14. A non-transitory computer readable medium as in claim 13, where a plurality of rating systems each of which is associated with one or more recommendation value are displayed concurrently on a single display view.

15. A non-transitory computer readable medium as in claim 9, where at least one rating system is accessed by selecting a function from an integrated network services platform.

16. A non-transitory computer readable medium as in claim 15, where the integrated network services platform is associated with a television.

17. A process for content selection by recommendation comprising:
- initiating a content and services display page on an Internet Protocol television device generated by an integrated network services platform, where the content and services display page includes a tleas a content view window and a category selection icon;
- at the Internet Protocol television device:
  - upon receipt of a command selecting the category selection icon, displaying a second layer page that includes an option selection icon, and
  - upon receipt of a command selecting the option selection icon, displaying a third page that incorporates a recommendations icon;
  - automatically requesting the content recommendation values from the content accumulator via a network connection upon receipt of a command selecting the recommendations icon;
- compiling content recommendation values from at least first and second content recommendation providers;
- where at least the second content recommendation provider comprises a social media web site that provides a recommendation value that use a different rating scale than a rating scale used by the first content recommendation site;
- displaying the content recommendation values on a single visual content recommendation display screen where a first set of content recommendation values from the first content recommendation provider is more prominent than all other sets of content recommendation values for the same content on the single visual display; and
- selecting the content recommendation value replaces the content recommendation display screen with the content associated with the selected content recommendation value.

* * * * *

UNITED STATES PATENT AND TRADEMARK OFFICE
CERTIFICATE OF CORRECTION

PATENT NO. : 8,607,273 B2
APPLICATION NO. : 13/014915
DATED : December 10, 2013
INVENTOR(S) : Yuko Nishikawa It is certified that error appears in the above-identified patent and that said Letters Patent is hereby corrected as shown below:

In the Claims

At Column 7, Line 44, replace "font the" with --font than the--

At Column 8, Line 21, replace "a tleas" with --at least--

Signed and Sealed this
Nineteenth Day of July, 2022

*Katherine Kelly Vidal*
*Director of the United States Patent and Trademark Office*